United States Patent
Kim et al.

(10) Patent No.: US 9,197,026 B2
(45) Date of Patent: Nov. 24, 2015

(54) MOLDING METHOD OF PRINTED CIRCUIT BOARD ASSEMBLY

(75) Inventors: Hyun Tae Kim, Suwon-si (KR); Tae Sang Park, Seoul (KR); Young Jun Moon, Hwaseong-si (KR); Soon Min Hong, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 363 days.

(21) Appl. No.: 13/211,652

(22) Filed: Aug. 17, 2011

(65) Prior Publication Data
US 2012/0045910 A1 Feb. 23, 2012

(30) Foreign Application Priority Data
Aug. 23, 2010 (KR) .................. 10-2010-0081686

(51) Int. Cl.
*H01R 43/00* (2006.01)
*H05K 13/00* (2006.01)
*H01R 43/24* (2006.01)

(52) U.S. Cl.
CPC ........... *H01R 43/24* (2013.01); *Y10T 29/49147* (2015.01)

(58) Field of Classification Search
CPC .. H01R 43/24; H01L 21/568; H01L 21/6835; H01L 23/24; H01L 23/3114; H01L 24/97; Y10T 29/49126; Y10T 29/49139; Y10T 29/49147
USPC ............ 29/830, 832, 841, 854–856; 257/691, 257/693, 787; 264/263, 272.17; 438/127
See application file for complete search history.

(56) References Cited

U.S. PATENT DOCUMENTS 4,822,550 A * 4/1989 Komathu ................. 29/841
5,663,106 A * 9/1997 Karavakis et al. ........ 29/841
5,689,137 A * 11/1997 Weber ..................... 257/693

FOREIGN PATENT DOCUMENTS

CN  1244831 A  2/2000

OTHER PUBLICATIONS

Chinese Office Action dated May 4, 2015 for corresponding CN Application No. 201110220965.8.

* cited by examiner

*Primary Examiner* — Donghai D Nguyen
(74) *Attorney, Agent, or Firm* — Harness, Dickey & Pierce, P.L.C.

(57) ABSTRACT

Disclosed is a printed circuit board assembly PBA on which a connector for electrical connection to an external connection element is mounted. Such an assembly may be formed with a molding method of a PBA which includes applying a polymer resin to the PBA to mold the PBA in order to offer stiffness thereto. The foregoing method of molding the PBA according to the present disclosure is a molding method of a PBA including a PCB and a connector mounted on the PCB to electrically connect the same to an external connection element. The method includes combining the connector with a connector cover, applying a resin to the PBA combined with the connector cover to execute molding of the PBA, and separating the connector cover from the molded PBA to expose the electrode terminal for an external connection element.

16 Claims, 19 Drawing Sheets

MOLDING METHOD OF PRINTED CIRCUIT BOARD ASSEMBLY

CROSS-REFERENCE TO RELATED APPLICATION

This application claims priority under 35 U.S.C. §119 to Korean Patent Application No. 2010-081686, filed on Aug. 23, 2010, with the Korean Intellectual Property Office (KIPO), the disclosure of which is incorporated herein by reference in its entirety.

BACKGROUND

1. Field

Example embodiments relate to a method for molding a printed circuit board assembly by applying a resin to the printed circuit board assembly equipped with a connector for electrical connection to an external connection element in order to expose an electrode terminal of the connector, so that the assembly can be freely connected to the external connection element and disconnected from the same even when the assembly is thoroughly molded by double-sided molding.

2. Description of the Related Art

Consumer demand for electronic goods with reduced thickness is on the rise. In general, in order to reduce the thickness of an electronic apparatus, it is necessary to decrease a thickness of a printed circuit board (PCB) and an assembly thereof (PBA) installed inside the apparatus.

That is, a thin PCB should be used and any technique capable of reducing the thickness of any of the components mounted on the thin PCB will prove useful in furtherance of this goal.

Given these conditions, PCBs made of silicon or glass materials are currently being developed as replacements for conventional polymer based PCBs. However, for an apparatus employing such a PCB, the PCB is liable to be broken by external loads caused by falling and/or impact.

Accordingly, in order to prevent such PCB failure, a PCB molding process using epoxy resin after electronic components are mounted on the PCB is employed.

However, since an exposed terminal is required to electrically connect the molded PCB to an external circuit, a portion of the molded PCB, at which a connector to be linked to the external circuit is provided, is generally excluded from molding. This is because, if the entirety of a PBA equipped with a connector is subjected to molding, a resin material penetrates into the connector and the connector will be prevented from being coupled to an external connection element.

SUMMARY

Example embodiments provide a PBA molding method enabling free connection/disconnection of a connector to/from an external connection element even after the PBA having the connector is thoroughly molded.

In accordance with example embodiments, a method for molding a printed circuit board assembly (PBA) is provided. In example embodiments, the PBA may include a printed circuit board (PCB) and a connector on the PCB and the connector may be configured to electrically connect the PCB to an external connection element. In example embodiments, the method may include covering an electrode terminal of the connector with a connector cover to protect the electrode cover from resin, applying the resin to the PBA having the electrode terminal covered by the connector cover to cover the PBA and form a molded PBA, and separating the connector cover from the molded PBA to expose the electrode terminal.

In accordance with example embodiments, a printed circuit board assembly (PBA) may include a printed circuit board (PCB) and a connector on the PCB. In example embodiments the connector may be configured to electrically connect the PCB to an external connection element and the connector may be further configured to attach to a connector cover that may be detachably combined with the connector in order to hide and expose an electrode terminal of the connector, by which the connector is connected to the external connection element.

In accordance with example embodiments, a molding method of a PBA may include a PCB and a connector mounted on the PCB to electrically connect the PCB to an external connection element. Such a molding method may include combining the connector with a connector cover not to expose an electrode terminal of the connector by which the connector is connected to the external connection element (often referred to as 'the electrode terminal for external connection element'), applying a resin to the PBA combined with the connector cover to execute molding of the PBA, and separating the connector cover from the molded PBA, so as to expose the electrode terminal for external connection element.

In this regard, the PCB may be fabricated using a silicon Si or a glass material.

The molding process may comprise double-faced molding.

The connector cover may be combined with the connector in a fitting manner.

Alternatively, the connector cover may be combined with the connector, using a double-sided adhesive tape.

The connector cover may be combined with the connector such that the connector is not fully exposed to the outside.

Herein, in order to easily remove a resin hardened after molding from the connector cover, the cover may have at least one inclined lateral side.

In order to easily remove the resin hardened after molding from the connector cover, the cover may be made of a Teflon-based material.

Moreover, in order to easily remove the resin hardened after molding from the connector cover, the cover may be combined with the connector after applying a release agent to the connector.

The connector cover may be separated from the molded PBA by cutting a peripheral side of the connector cover.

The connector may be integrated with the connector cover and, in order to easily separate the connector cover from the connector in the molded PBA, a slit may be formed between the connector and the connector cover.

An electrode terminal of the connector linked to the PCB may be connected to the PCB at a bottom of the connector.

The electrode terminal of the connector linked to the PCB may be extended outward from one side of a connector body and may be connected to the PCB.

An electrode terminal of the connector to be linked to the external connection element may be exposed to the outside in a circular form, may connect to the external connection element at a top of the connector body, and may be aligned in a zig-zag form.

Alternatively, the electrode terminal to be linked to the external connection element may be exposed to the outside in an elongated form, connected to the external connection element at the top of the connector body, and aligned in a straight line.

The PBA according to example embodiments may include a PCB and a connector mounted on the PCB to electrically connect the PCB to an external connection element, and further, may have a connector cover detachably combined with the connector in order to hide or expose an electrode terminal of the connector to be linked to the external connection element.

In this regard, the PCB may be fabricated using silicon or a glass material.

Using the molding method of PBA according to example embodiments, the entirety of the PBA may be molded, in turn improving stiffness of an electronic apparatus having a PCB made of a thin or brittle material and thereby enabling free connection of the apparatus to an external connection element.

BRIEF DESCRIPTION OF THE DRAWINGS

These and/or other aspects of the invention will become apparent and more readily appreciated from the following description of example embodiments, taken in conjunction with the accompanying drawings of which.

DETAILED DESCRIPTION

Figure 1A:
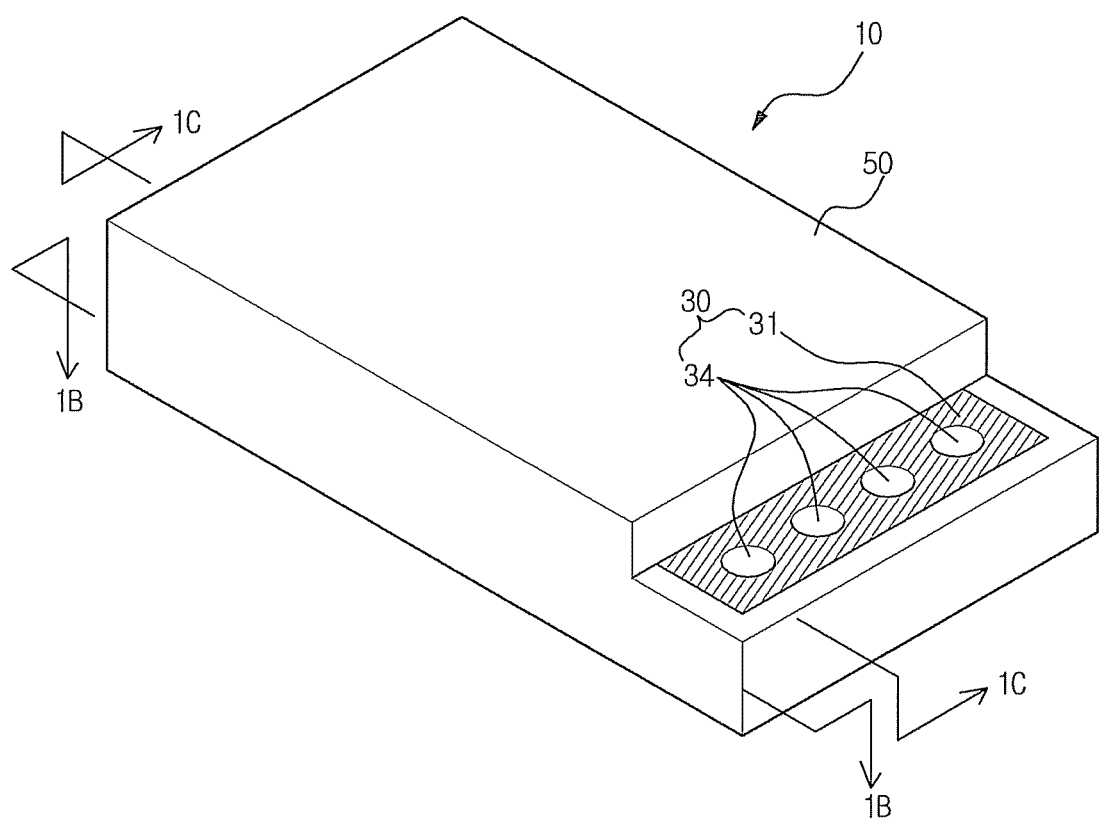
FIG. 1A is a perspective view illustrating a printed circuit board assembly (PBA) molded by a molding method according to example embodiments.

Example embodiments will be described more fully hereinafter with reference to the accompanying drawings, in which example embodiments are shown. The present invention may, however, be embodied in many different forms and should not be construed as limited to example embodiments as set forth herein. Rather, example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers that may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be described in detail in conjunction with the accompanying drawings.

Figure 1B:
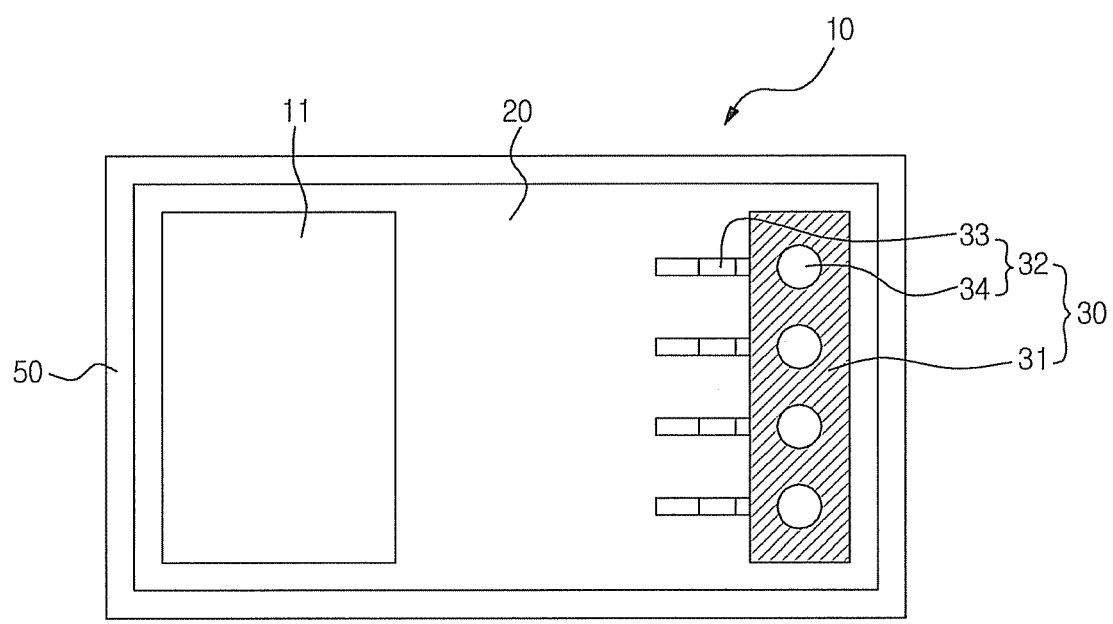
FIG. 1B is a plan view taken along line 1B-1B shown in FIG. 1A.

FIG. 1A is a perspective view illustrating a printed circuit board assembly (PBA) molded by a molding method according to example embodiments. FIG. 1B is a plan view taken along line 1B-1B shown in FIG. 1A and FIG. 1C is a cross-sectional view taken along line 1C-1C shown in FIG. 1A.

Figure 1C:
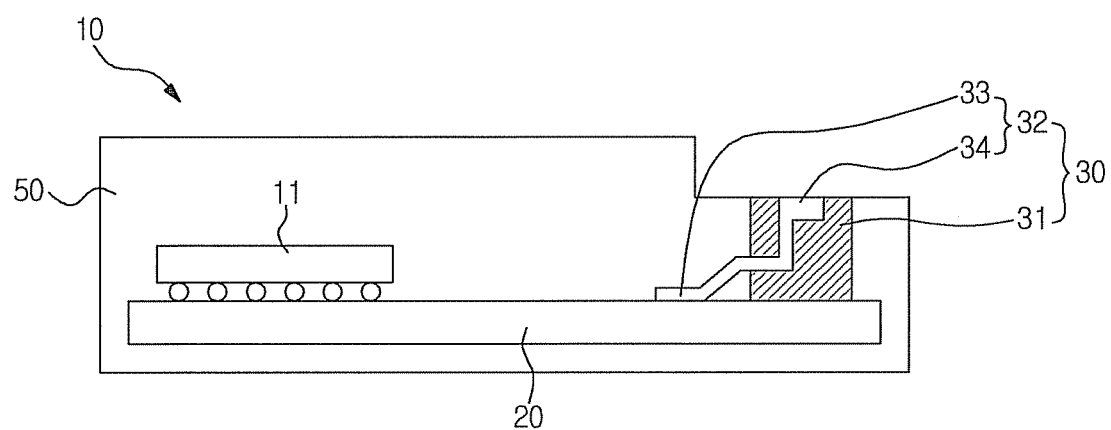
FIG. 1C is a cross-sectional view taken along line 1C-1C shown in FIG. 1A.

Referring to FIGS. 1A to 1C, a PBA 10 molded by a molding method according to example embodiments may include a printed circuit board (PCB) 20, an electronic component 11, and a connector 30.

The PCB 20 may have a conductive wire, for example, a metal wire, fixed therein and may be a plate on which at least one electronic component 11, for example, a circuit device, is installed to form a circuit depending upon purpose thereof.

The molding method according to example embodiments may be generally applied to a thin and/or brittle PCB 20 fabricated using Si or a glass material. On the other hand, a PCB may be made of a polymer material having a relatively high stiffness.

The connector 30 may comprise a body 31 and an electrode part 32, and may be an electronic component mounted on the PCB 20 to be electrically connected with the same, so as to send/receive electrical signals to/from an external circuit or receive power from an external power supply. The PCB 20 may transmit different electrical signals to/from an external connection element 60 (see FIG. 4G) via the connector 30 to execute desired functions. Here, the external connection element 60 may be a flexible PCB.

The connector body 31 substantially defines the overall appearance of the connector 30.

The electrode part 32 of the connector may have multiple electrode terminals 33 and 34 formed inside the connection body 31 at intervals that may or may not be constant. In example embodiments, the electrode terminals 34 may correspond to multiple electrode terminals 61 (see FIG. 4G) which are placed in the external connection element 60.

In example embodiments, the electrode terminals 33 may connect the connector 30 to the PCB 20 (thus, an electrode terminal 33 may be referred to as 'a PCB terminal'). In example embodiments, the electrode terminal 34 may connect the connector 30 to the external connection element 60 (thus, an electrode terminal 34 may be referred to as 'the terminal for external connection element'). In example embodiments, the terminals 33 and 34 may be fabricated using a conductive material.

As for the PBA 10 molded by the molding method according to example embodiments, only one side at the top of the connector 30 as well as the electrode terminal 34 for external connection element are exposed to the outside, while top and bottom sides of the other part of the PBA 10 are thoroughly molded with a resin 50.

As shown in FIGS. 1A-1C, in the PBA 10 molded by the molding method according to example embodiments, the electrode terminal 34 of the connector 30 to be linked to the external connection element 60 may be exposed to the outside, thus the electrode terminal 34 may be easily connected to the external connection element 60. Also, except for a part of the connector 30 including the electrode terminal 34 for external connection element, the other part may be thoroughly molded using the resin 50, so as to have relatively high stiffness.

Figure 2A:
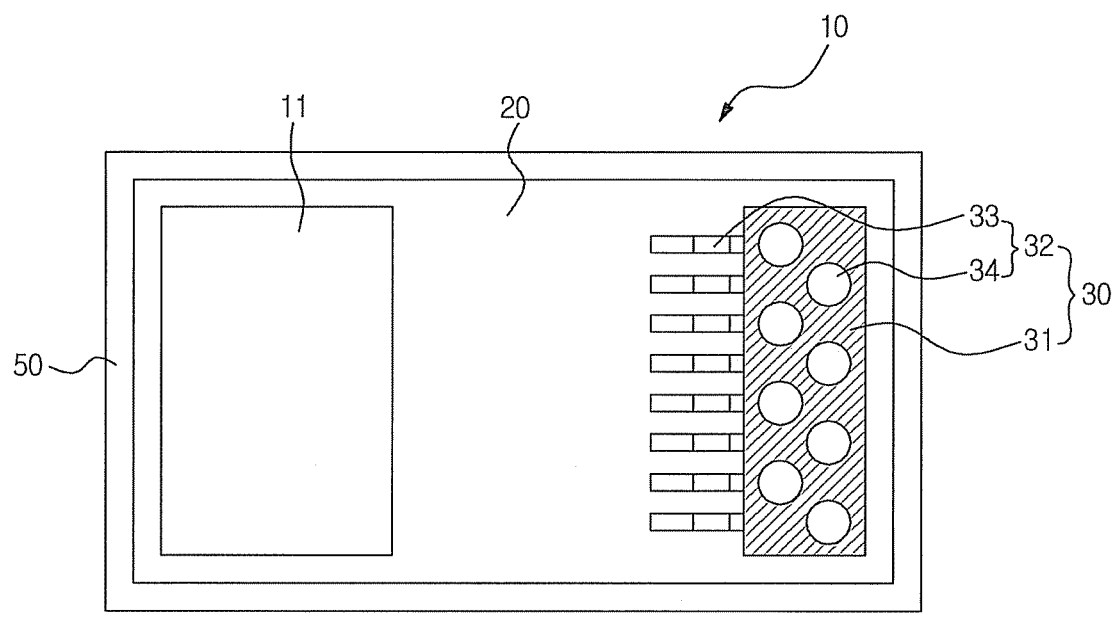
FIGS. 2A and 2B are plan views illustrating a modification of FIG. 1B.
Figure 2B:
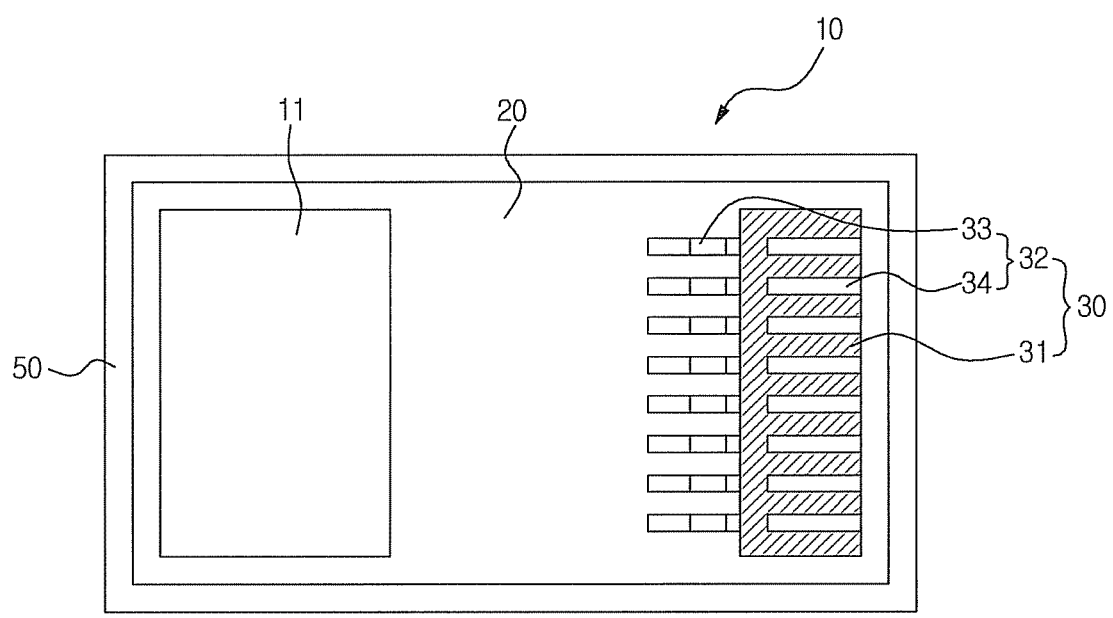
Figure 3:
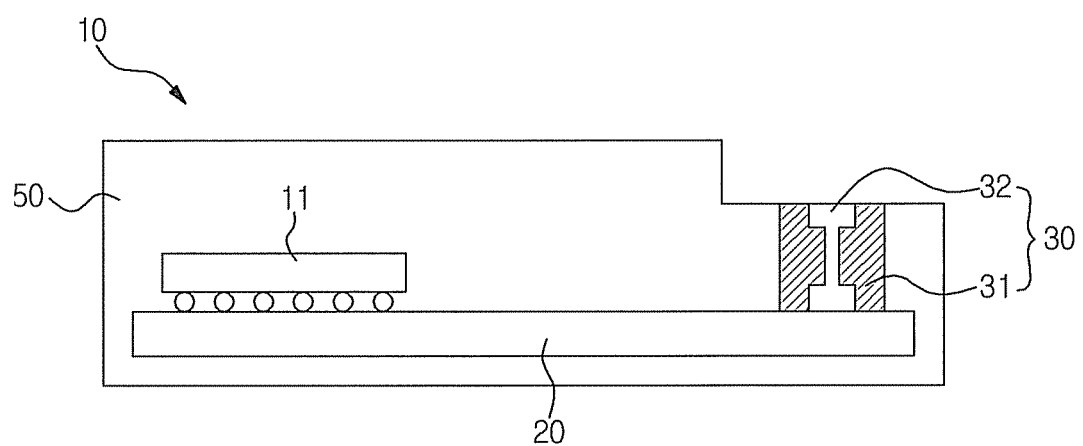
FIG. 3 is a cross-sectional view illustrating a modification of FIG. 1C.

FIGS. 2A and 2B are plan views illustrating a modification of FIG. 1B, while FIG. 3 is a cross-sectional view illustrating a modification of FIG. 1C.

Referring to FIGS. 2A and 2B, as for the PBA 10 molded by the molding method according to example embodiments, shape and alignment of the electrode terminal 34 linked to an electrode terminal 61 of the external connection element may be varied depending upon the shape of the electrode terminal 61.

As illustrated in FIG. 2A, the electrode terminal 34 for external connection element may be exposed to the outside in a circular form and plural electrode terminals 34 may be aligned in a zig-zag form.

As illustrated in FIG. 2B, the electrode terminal 34 for external connection element may be exposed outside in an elongated form and plural electrode terminals 34 may be aligned in a straight line.

Example embodiments, however, are not limited to the above shapes and patterns as the shape of the PCB terminal 33 may be varied as well as the pattern.

As for the PBA 10 shown in FIG. 3, the PCB terminal 33 is connected to the PCB 20 at a bottom of the connector body 31.

Although the above description is given to explain possible modifications of shape and alignment of the electrode terminals 33 and 34 of the connector 30 in the PBA 10 molded by the molding method according to example embodiments, the foregoing shape and alignment are not particularly limited to these modifications but may include other modifications.

FIGS. 4A to 4I are respective views explaining a molding method of PBA according to example embodiments.

The molding method of PBA 10 according to example embodiments may include combining a connector 30 with a connector cover 40 such that an electrode terminal 34 of the connector 30, by which the connector is connected to an external connection element, is not coated with a resin 60 during molding, applying the resin 50 to the PBA 10 combined with the connector cover 40 to execute molding of the PBA 10, and separating the connector cover 40 from the molded PBA 10 so as to expose the electrode terminal 34 for external connection element.

Figure 4A:
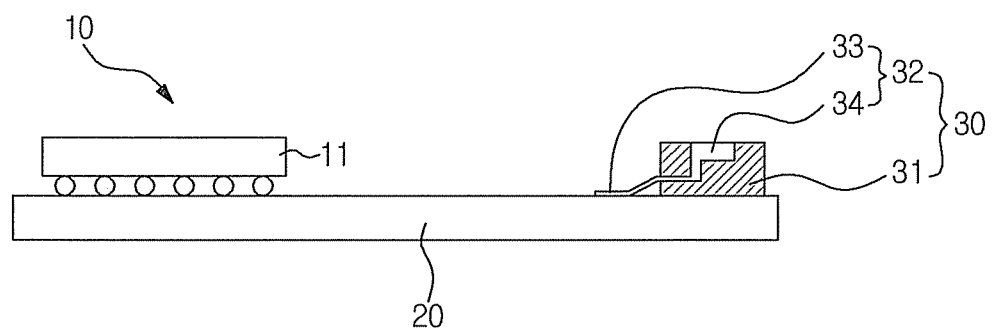
FIGS. 4A to 4I are respective views explaining a molding method of a PBA according to example embodiments.
Figure 4B:
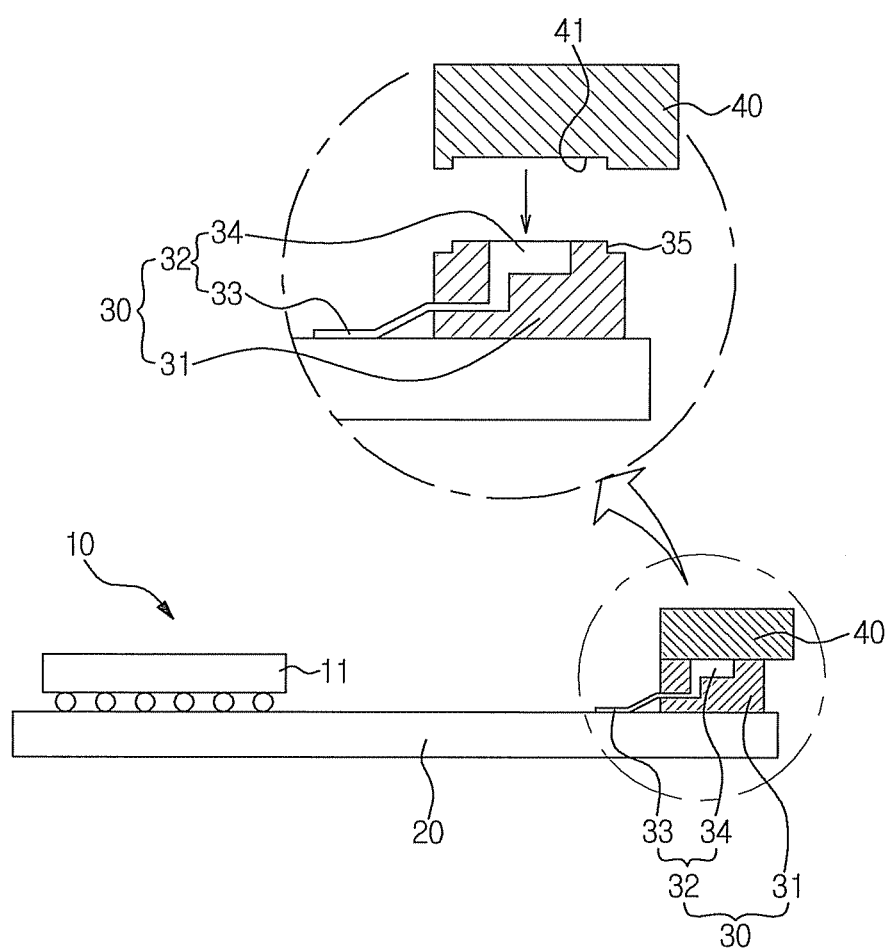
Figure 4C:
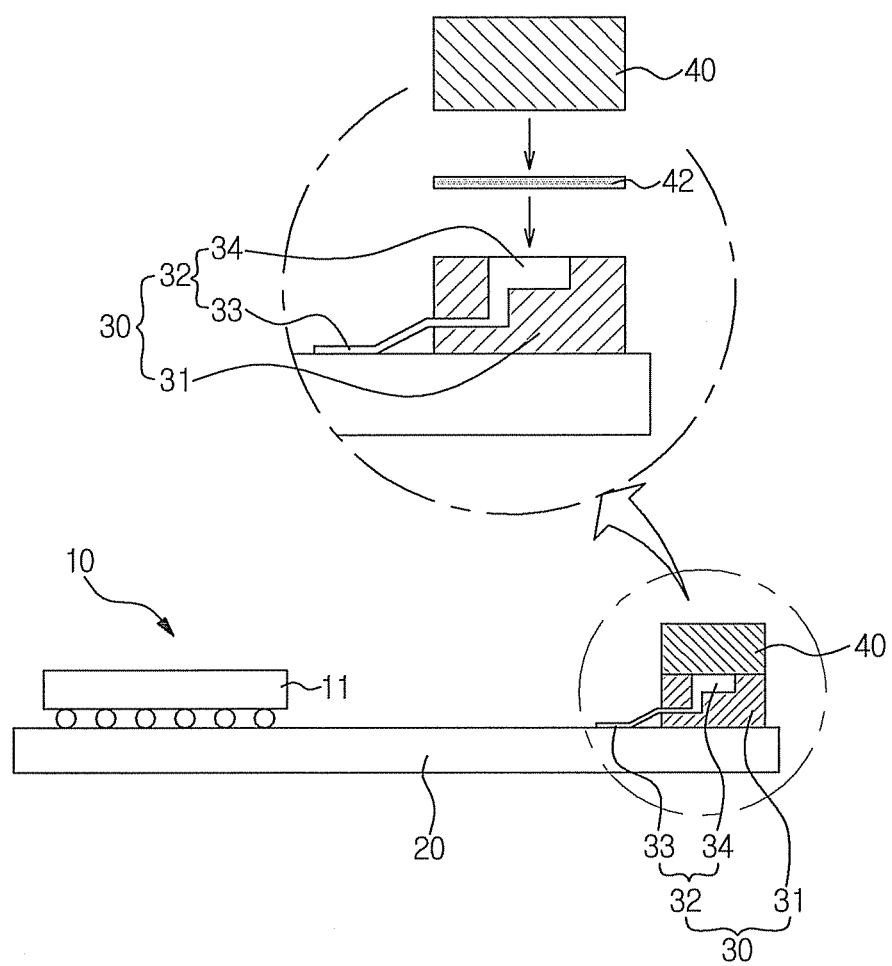

With regard to the PBA 10 according to example embodiments, combination of the connector 30 with the connector cover 40 may be performed as shown in FIG. 4B or 4C, such that the electrode terminal 34 for external connection element is not coated with the molding resin during molding, while a PCB 20 has an electronic component 11 and the connector 30 mounted thereon.

The connector cover 40 may be preferably fabricated using a Teflon material to enable easy separation of the same from a hardened resin 50.

Such combination of the connector 30 with the connector cover 40 may be performed in a fitting manner by forming a protrusion 35 on the top of the connector 30, as shown in FIG. 4B, and forming a groove 41 on the connector cover 40 wherein this groove corresponds to the protrusion 35 and the protrusion 35 of the connector is inserted into the groove, thereby fitting the connector 30 in the connector cover 40. The protrusion 35 of the connector and the groove 41 of the connector cover may have a difference in size suitable for a moderate-fit or loose-fit thereof, thus enabling these elements to be easily separated from each other by pulling the connector cover 40 after molding.

As shown in FIG. 4C, the connector 30 may be combined with the connector cover 40, using an adhesive 42 such as a double-sided adhesive tape. The adhesive 42 may have weak adhesion sufficient to separate the cover from the connector 30 by pulling the connector cover 40 after molding.

Figure 4D:
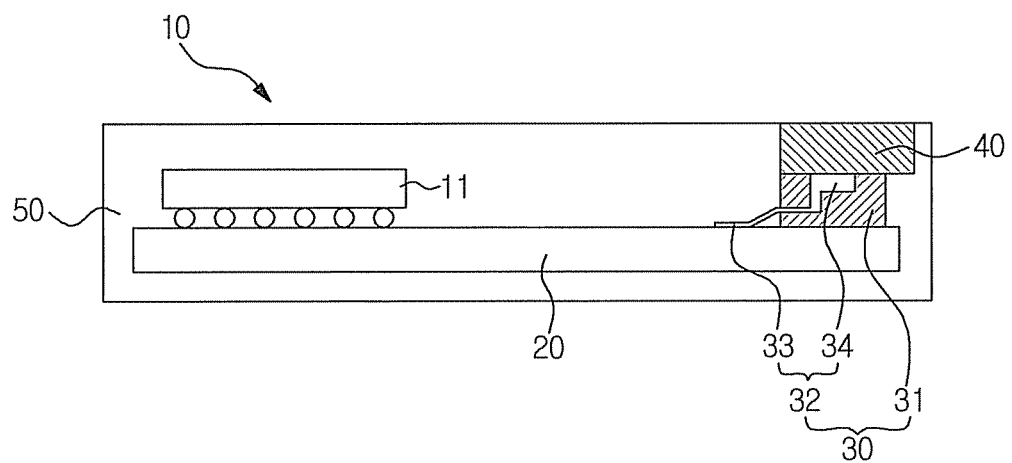

After combining the connector 30 with the connector cover 40 as described above, the resin 50 may be applied to the PBA 10 combined with the connector cover 40. Here, as shown in FIG. 4D, the entirety of top and bottom sides of the PBA 10 having the connector cover 40 is subjected to molding.

After hardening the resin 50, the connector cover 40 may be separated from the molded PBA 10 in order to expose the electrode terminal 34 for external connection element.

Figure 4E:
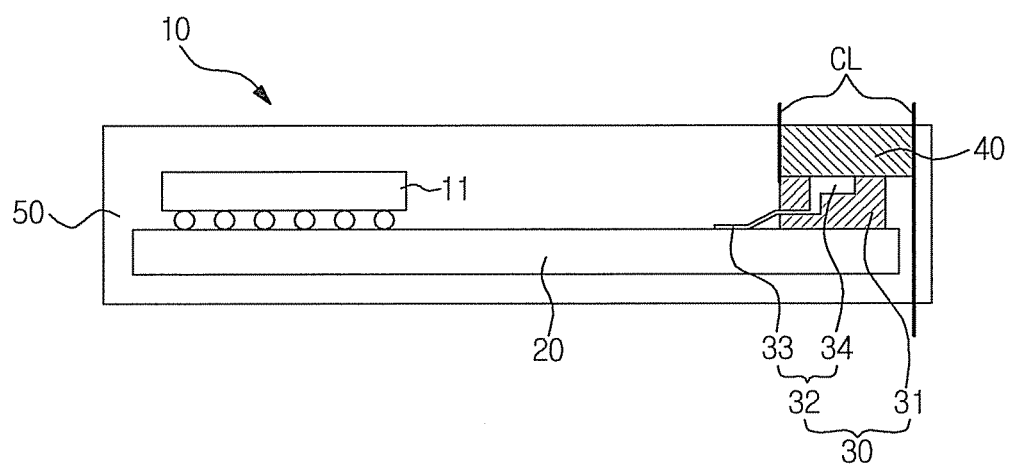

In this regard, in order to easily separate the connector cover 40, a cutting machine may be used to cut the connector cover 40 along a cutting line CL around the same, as shown in FIG. 4E, in turn separating the connector cover 40.

As described above, without a grinding or polishing process at a part between the connector 30 and the connector cover 40, cutting around the connector cover 40 alone enables simple separation of the connector 30 from the connector cover 40, thereby preventing or reducing contamination of the electrode terminal 34 for external connection element caused by epoxy mold compound powder generated during grinding or polishing, or due to high temperature.

Figure 4F:
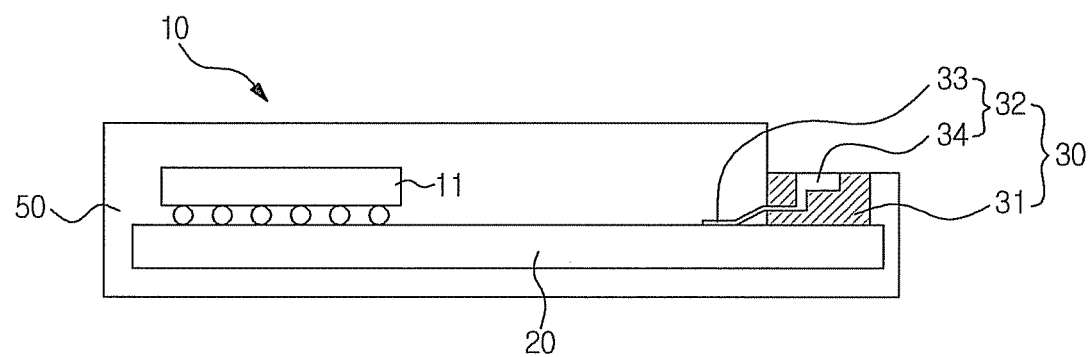

After separation of the connector cover 40, the electrode terminal 34 for external connection element is exposed and the other part of the connector 30 is molded with the resin 50 over the entirety of top and bottom sides thereof, as shown in FIG. 4F, in turn completing the molded PBA 10.

Figure 4G:
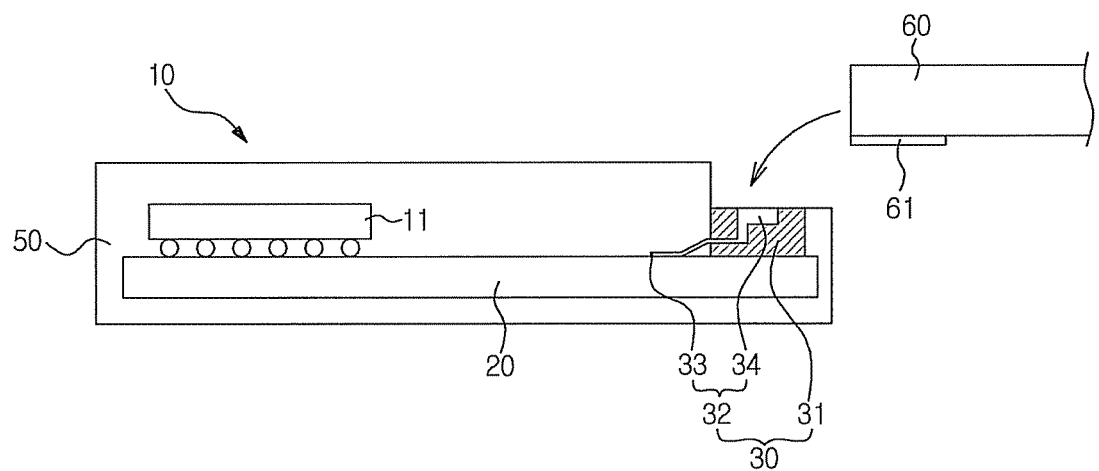

As shown in FIG. 4G, the molded PBA 10 may be electrically connected to the external connection element 60 by coupling the exposed electrode terminal 34 for external connection element to an electrode terminal 61 of the external connection element 60.

In this case, the electrode terminal 34 for external connection element and the electrode terminal 61 of the external connection element 60 may be coupled to one another by a direct connection process, for example, soldering-heat pressing, slide soldering, use of anisotropic conductive film (ACF), and heat pressing, thus improving coupling force between the connector 30 and the external connection element 60.

Figure 4H:
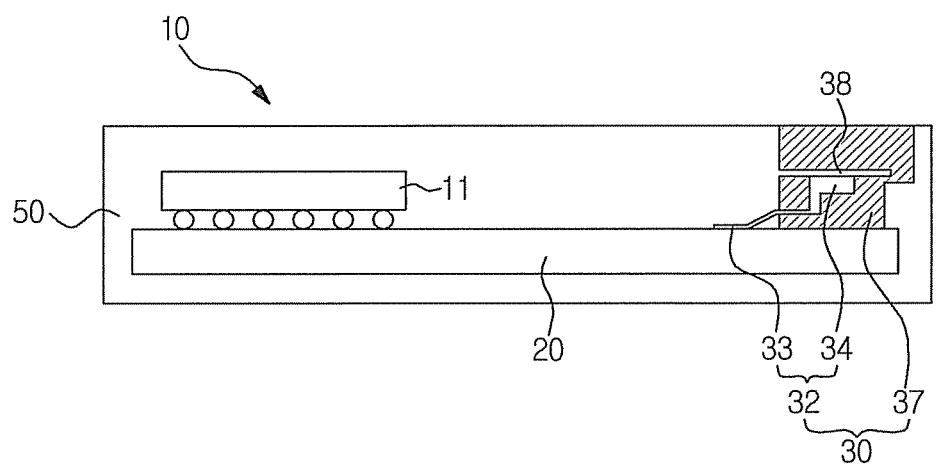
Figure 4I:
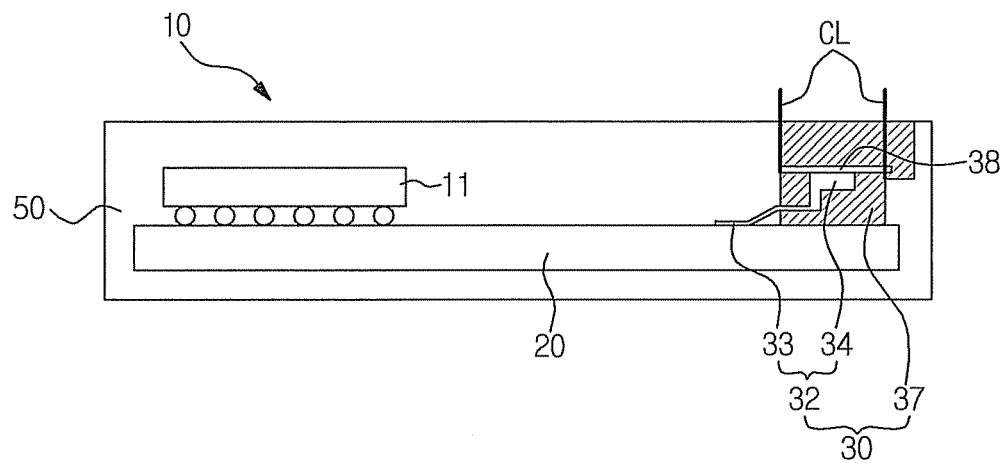

Referring to FIGS. 4H and 4I, if a slit 38 is present inside the connector body 37, the electrode terminal 34 for external connection element may be simply exposed by cutting the body along CL after molding then removing a part of the connector body 37, if the connector 30 is integrated and combined with the connector cover 40.

FIGS. 5A to 5D are respective views to explain, in sequential order, the molding method of the PBA according to example embodiments.

Figure 5A:
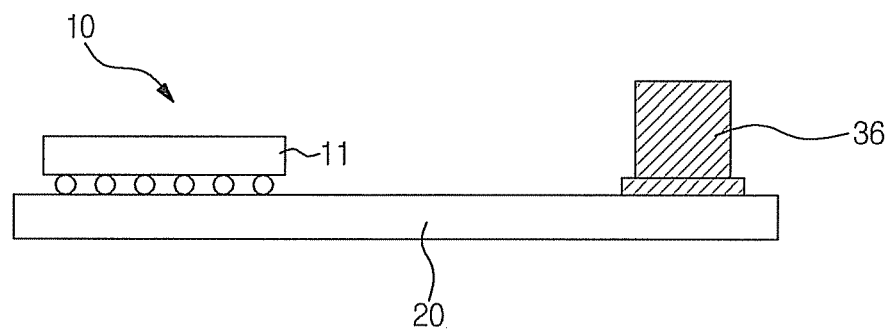
FIGS. 5A to 5D are respective views explaining, in sequential order, a molding method of a PBA according to example embodiments.

The PBA 10 shown in FIG. 5A has a socket type connector 36 for inspection of RF features, which is mounted on a PCB 20. Such a socket type connector 36 may include an electrode terminal placed therein, which has a small number of electrodes and does not require a fine pitch.

Figure 5B:
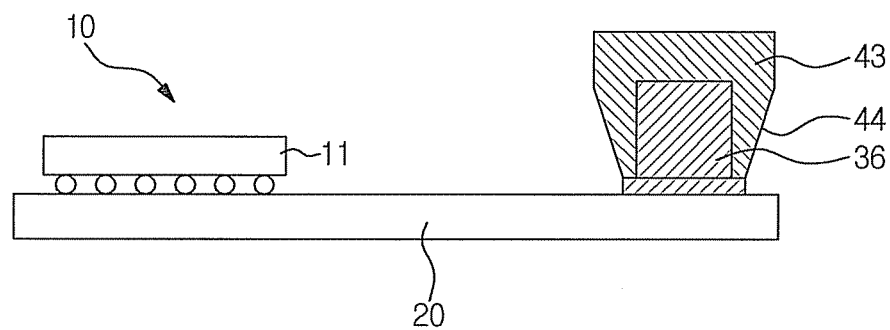

The molding method of the PBA 10 according to example embodiments may employ a connector cover 43 to enclose the entirety of the socket type connector 36, as shown in FIG. 5B.

A lateral side 44 of the connector cover 43 may be inclined to easily remove a resin 60 hardened after molding from the connector cover or, otherwise, be coated with a release agent.

Figure 5C:
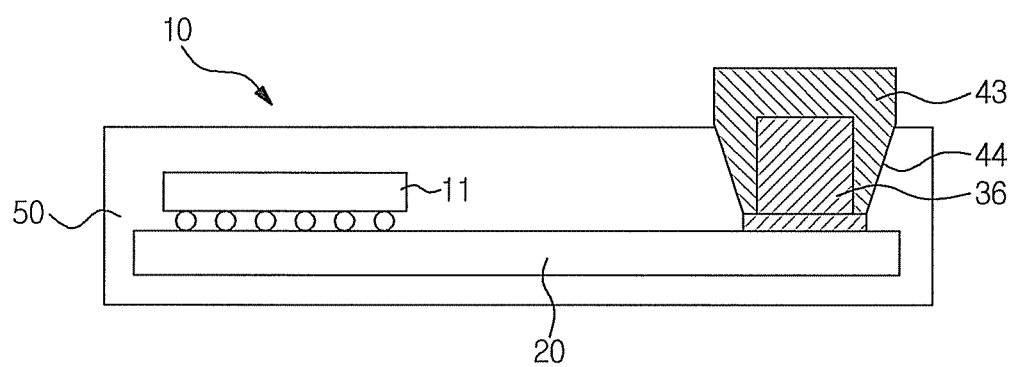
Figure 5D:
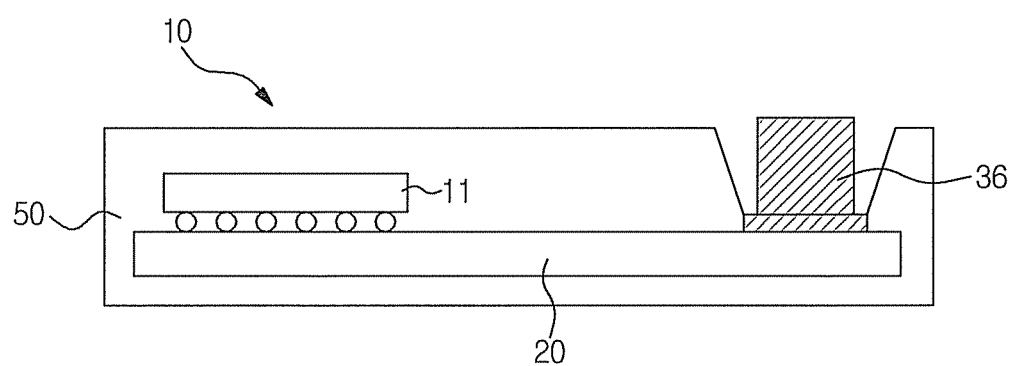

As shown in FIGS. 5C and 5D, the resin 50 may be applied to the PBA having the socket type connector 36 mounted thereon, followed by molding and resin hardening. Thereafter, the connector 36 may be exposed by separating the connector cover 43.

According to the foregoing technical configurations, the external connection element 60 may be freely connected to the connector 30 of the PBA 10 even though the top and bottom of the PBA 10 are thoroughly molded. In addition, an electronic apparatus equipped with the PBA as well as the PBA 10 may have favorably improved stiffness.

Although example embodiments have been shown and described in conjunction with accompanying drawings, it is clearly understood that the foregoing do not particularly restrict the scope of the present invention. Accordingly, it would be appreciated by those skilled in the art that various substitutions, variations and/or modifications may be made in example embodiments without departing from the principles and spirit of the invention.

What is claimed is:

1. A method for molding a printed circuit board assembly (PBA), the PBA including a printed circuit board (PCB) and a connector on the PCB, the connector being configured to electrically connect the PCB to an external connection element, the method comprising:
   covering an electrode terminal of the connector with a solid connector cover by combining the connector with the solid connector cover to protect the electrode terminal from resin;
   applying the resin to the PBA having the electrode covered by the solid connector cover to cover the PBA and form a molded PBA;
   cutting the molded PBA along a peripheral side of the solid connector cover; and
   separating the solid connector cover from the molded PBA to expose the electrode terminal.

2. The molding method according to claim 1, wherein the PCB is fabricated using at least one of a silicon (Si) and a glass material.

3. The molding method according to claim 1, wherein the molding is double-sided molding.

4. The molding method according to claim 1, wherein covering the electrode terminal of the connector with the solid connector cover includes combining the connector with the solid connector cover in a fitting manner.

5. The molding method according to claim 1, wherein covering the electrode terminal of the connector with the solid connector cover includes combining the connector and the solid connector cover with a double-sided adhesive tape.

6. The molding method according to claim 1, wherein covering the electrode terminal of the connector with the solid connector cover includes combining the solid connector cover with the connector such that an entirety of the connector is covered by the solid connector cover.

7. The molding method according to claim 6, wherein the solid connector cover has a lateral side inclined in order to remove the solid connector cover from the resin after the resin has hardened.

8. The molding method according to claim 1, wherein the solid connector cover includes a Teflon material in order to remove the solid connector cover from the resin after the resin has hardened.

9. The molding method according to claim 1, wherein the solid connector cover is coated with a release agent to remove the solid connector cover from the resin after the resin has hardened.

10. The molding method according to claim 1, wherein the connector is integrated and combined with the solid connector cover and a slit is formed between the connector and the solid connector cover to separate the solid connector cover from the connector.

11. The molding method according to claim 1, wherein the electrode terminal of the connector, by which the connector is connected to the external connection element, is connected to the PCB at a bottom of the connector.

12. The molding method according to claim 1, wherein the electrode terminal of the connector, by which the connector is connected to the external connection element, is extended outward from one side of the connector body and connected to the PCB.

13. The molding method according to claim 1, wherein the electrode terminal for external connection element is extended outward in a circular form such that the terminal is connected to the external connection terminal at a top of the connector body and aligned in a zig-zag form.

14. The molding method according to claim 1, wherein the electrode terminal for external connection element is exposed outside in an elongated form such that the terminal is connected to the external connection element at a top of the connector body and aligned in a straight line.

15. The molding method according to claim 1, wherein the connector on the PCB is formed within a boundary of the PCB.

16. The molding method according to claim 1, wherein the separating the solid connector cover from the molded PBA selectively exposes a top surface of the electrode terminal.

* * * * *